(12) United States Patent
Castaneda et al.

(10) Patent No.: US 10,078,996 B2
(45) Date of Patent: Sep. 18, 2018

(54) PROCESSING DEVICE WITH FIELD-REPLACEABLE USER INTERFACE FOR INDUSTRIAL VEHICLE

(71) Applicant: Crown Equipment Corporation, New Bremen, OH (US)

(72) Inventors: Anthony T. Castaneda, Troy, OH (US); Gregg E. Hillman, Sidney, OH (US); Timothy A. Wellman, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 30 days.

(21) Appl. No.: 15/211,251

(22) Filed: Jul. 15, 2016

(65) Prior Publication Data

US 2017/0018253 A1    Jan. 19, 2017

Related U.S. Application Data

(60) Provisional application No. 62/193,858, filed on Jul. 17, 2015.

(51) Int. Cl.
*G06F 1/16* (2006.01)
*G09G 5/00* (2006.01)
(Continued)

(52) U.S. Cl.
CPC .......... *G09G 5/006* (2013.01); *G06F 1/1654* (2013.01); *G06F 1/1656* (2013.01); *G06F 1/182* (2013.01); *G06F 3/0412* (2013.01); *G06F 3/0416* (2013.01); *G06F 13/4068* (2013.01); *G06F 13/4282* (2013.01); *H04L 41/22* (2013.01); *G09G 2354/00* (2013.01); *G09G 2380/10* (2013.01)

(58) Field of Classification Search
CPC .................................................. G09G 2300/04
See application file for complete search history.

(56) References Cited

U.S. PATENT DOCUMENTS 6,532,152 B1 * 3/2003 White ............... G02F 1/133308
312/223.1
8,060,400 B2    11/2011 Wellman
(Continued)

FOREIGN PATENT DOCUMENTS

EP            2472350 A2      7/2012

OTHER PUBLICATIONS

De Ronde, Jan; International Search Report and Written Opinion of the International Searching Authority; dated Sep. 21, 2016; European Patent Office; Rijswijk, Netherlands.

*Primary Examiner* — William Lu
(74) *Attorney, Agent, or Firm* — Stevens & Showalter, LLP

(57) ABSTRACT

A processing device for an industrial vehicle includes a field-replaceable user interface. The processing device includes a service module and a main module. The service module, which is field replaceable, includes a display having a touch screen, at least one user input control and a service module circuit board. The main module comprises a main module circuit board. The service module circuit board and the main module circuit board include complementary rigid couplers that connect independently of a cable there between when the service module is mated with the main module.

21 Claims, 8 Drawing Sheets

(51) Int. Cl.
*H04L 12/24* (2006.01)
*G06F 3/041* (2006.01)
*G06F 13/42* (2006.01)
*G06F 13/40* (2006.01)
*G06F 1/18* (2006.01)

(56) References Cited

U.S. PATENT DOCUMENTS

| | | | | |
|---|---|---|---|---|
| 8,457,682 B2* | 6/2013 | Raab | ................ | H04M 1/72536 370/390 |
| 8,934,226 B2* | 1/2015 | Smith | .................. | G06F 1/1613 361/679.2 |
| 2004/0249557 A1* | 12/2004 | Harrington | ......... | G01M 17/007 701/115 |
| 2006/0054335 A1* | 3/2006 | Rapp | .................... | G01G 21/283 174/481 |
| 2007/0054736 A1* | 3/2007 | See | ........................ | A63F 13/06 463/37 |
| 2007/0152503 A1* | 7/2007 | Kowalick | .......... | H01R 13/6397 307/10.1 |
| 2008/0094372 A1* | 4/2008 | Philipp | ................. | G06F 1/1601 345/173 |
| 2008/0214022 A1* | 9/2008 | Kowalick | ........... | H01R 13/443 439/34 |
| 2009/0043446 A1* | 2/2009 | Drew | ..................... | G01C 21/00 340/438 |
| 2011/0171612 A1* | 7/2011 | Gelinske | ................... | G09B 9/08 434/35 |
| 2012/0065834 A1* | 3/2012 | Senart | .................... | G07C 5/008 701/31.4 |
| 2012/0169614 A1* | 7/2012 | Oberpriller | ........... | G06F 1/1656 345/173 |
| 2014/0067195 A1* | 3/2014 | James | ................... | G06Q 50/30 701/32.4 |
| 2015/0187147 A1* | 7/2015 | Tieman | .................... | G07C 5/02 701/33.2 |
| 2016/0350984 A1* | 12/2016 | Tieman | .................. | G07C 5/008 |

* cited by examiner

PROCESSING DEVICE WITH FIELD-REPLACEABLE USER INTERFACE FOR INDUSTRIAL VEHICLE

CROSS REFERENCE TO RELATED APPLICATIONS

This application claims the benefit of U.S. Provisional Patent Application Ser. No. 62/193,858, filed Jul. 17, 2015, entitled PROCESSING DEVICE WITH FIELD-REPLACEABLE USER INTERFACE FOR INDUSTRIAL VEHICLE, the disclosure of which is hereby incorporated herein by reference.

BACKGROUND

Various aspects of the present invention relate generally to industrial vehicles and specifically to displays on industrial vehicles.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via mobile wireless transceivers and displays mounted on industrial vehicles. The wireless transceivers are used as interfaces to the management system to direct workers in their tasks, e.g., by instructing workers where and/or how to pick, pack, put away, move, stage, process or otherwise manipulate the items within a facility. The wireless transceiver may also be used in conjunction with a suitable input device to scan, sense or otherwise read tags, labels or other identifiers to track the movement of designated items within the facility.

BRIEF SUMMARY

According to aspects of the present disclosure, a processing device for an industrial vehicle comprises a main module and a field replaceable service module, where the service module defines a graphical user interface. The main module includes a main module circuit board that supports main module circuitry. The main module circuitry comprises a processor that is communicably coupled to memory and input/output circuitry, where the processor is configured to read instructions from the memory to execute vehicle-specific processing. Moreover, a rigid main-side coupler is electrically connected to the main module circuitry (via the main module circuit board). The service module includes a display, optionally with a touch screen capability, a control area having a user input control, and a service module circuit board. The service module circuit board includes interface circuitry communicably coupled to the display and the user input control. Also, a rigid service-side coupler is electrically connected to the interface circuitry (via the service module circuit board). When the service module is attached to the main module, the rigid service-side coupler aligns with and electrically connects to the rigid main-side coupler. Also, the service module connects to the main module by a temporary securement, (e.g., bolts, screws, etc.) facilitating field replacement of the service module to the main module.

According to further aspects of the present disclosure, the rigid service-side coupler electrically connects to the rigid main-side coupler independently of a cable between the first rigid coupler and the second rigid coupler, e.g., the rigid service-side coupler directly electrically connects to the rigid main-side coupler.

According to yet further aspects of the present disclosure, a first anti-vibration post extends a gap between the main module circuit board and the service module circuit board when the service module is mated with the main module. Moreover, a second anti-vibration post may be provided, which also extends the gap between the main module circuit board and the service module circuit board when the service module is mated with the main module. For instance, the first anti-vibration post and the second anti-vibration post can flank the rigid main-side coupler mated to the rigid service-side coupler.

DETAILED DESCRIPTION

According to various aspects of the present disclosure, a processing device comprises a main module and a service module, which couple together to create an integrated processing device on an industrial vehicle. Basically, the main module includes data processing circuitry, memory, a rigid main-side data coupler, and various other components, including input/output connections, ports, connectors, etc. The data processing circuitry includes a processor coupled to the memory for locally processing and storing information about the industrial vehicle (e.g., truck identification, operator identification, data logging of vehicle operating state, vehicle sensor data, etc.), as discussed in greater detail herein. Since the main module manages vehicle data, the main module is also referred to herein as a main management module.

Correspondingly, the service module is field-replaceable (defining a field-replaceable service module). The service module includes a display (e.g., a liquid crystal display (LCD)) one or more user input controls (e.g., a touch screen, buttons or other controls), any necessary data processing circuitry, and a rigid service-side data coupler that couples to the rigid main-side data coupler on the main module to effect data communication between the main module and the service module.

In an example implementation, whereas the main module remains coupled to the industrial vehicle, the service module is field-replaceable, and thus may be removed and replaced with a different service module. Notably, the service modules do not store any collected data that is specific to the industrial vehicle. Thus, if the display screen gets damaged, a new service module may be coupled to the main module without losing any information about the industrial vehicle.

Further, the main module communicably couples to the service module directly through the mating of the rigid couplers (mating of the rigid service-side data coupler with the rigid main-side data coupler) independent of a cable, e.g., to pass display data, input/output control data, combinations thereof, etc. Thus, high-speed data may be reliably and accurately transmitted between the main module and service module, even in a noisy environment, because only one stable connection is utilized between the main module and service module (as opposed to two connections required by the respective ends of a cable).

Moreover, the main module, the service module, or both can include at least one anti-vibration post that prevents vibration damage to the rigid couplers.

Figure 1:
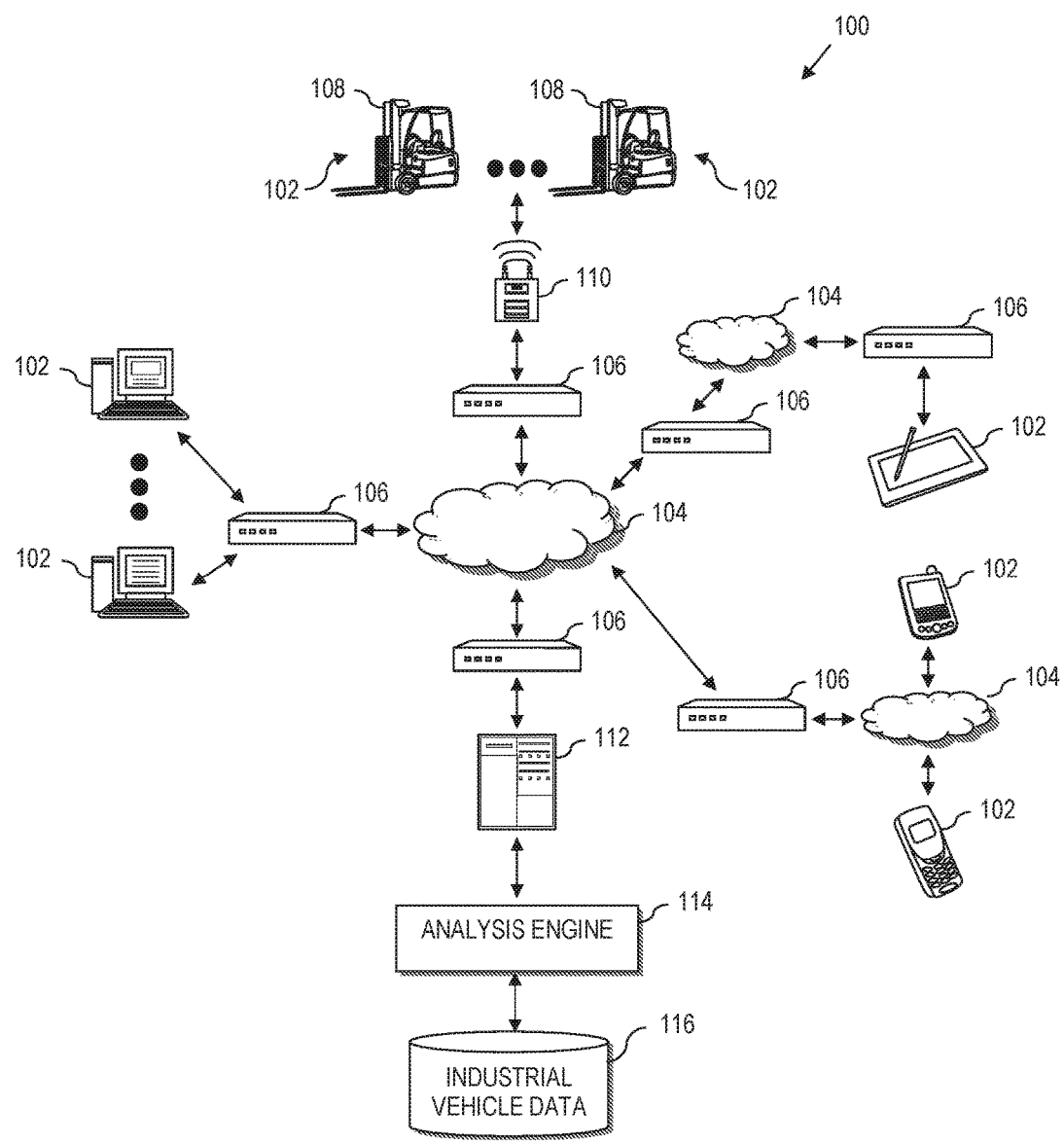
FIG. 1 is a block diagram of an example system that supports dynamic data communication with industrial vehicles, according to aspects of the disclosure.

System Overview:

Turning now to the figures and in particular to FIG. 1, a general diagram of a computer system 100 is illustrated according to various aspects of the present disclosure. The illustrated computer system 100 is a special purpose (particular) system that operates in a manner that enables industrial vehicles to communicate wirelessly across a computer enterprise. The computer system 100 comprises a plurality of hardware processing devices (designated generally by 102) that are linked together by one or more network(s) (designated generally by 104).

The network(s) 104, e.g., wired or wireless networks, provide communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.).

A processing device 102 can be any device capable of communicating over the network 104. In certain contexts and roles, a processing device 102 is intended to be mobile (e.g., a hardware-based processing device 102 provided on an industrial vehicle 108 such as a forklift truck, reach truck, stock picker, turret truck, tow tractor, rider pallet truck, walkie stacker truck, etc.). In this regard, industrial vehicles include a processing device 102 that communicates wirelessly to the network 104 to carry out the features described herein. Under such circumstances, the industrial vehicles 108 can wirelessly communicate through one or more access points 110 to a corresponding networking component 106. Also, the industrial vehicles 108 can be equipped with WiFi, cellular or other suitable technology that allows the processing device 102 on the industrial vehicle 108 to communicate directly with a remote device (e.g., over the networks 104).

The illustrative computer system 100 also includes a hardware server 112 (e.g., a web server, file server, and/or other processing device) that supports an analysis engine 114 and corresponding data sources (collectively identified as data sources 116). The analysis engine 114 and data sources 116 provide resources of the processing devices 102 installed on industrial vehicles 108.

Figure 2:
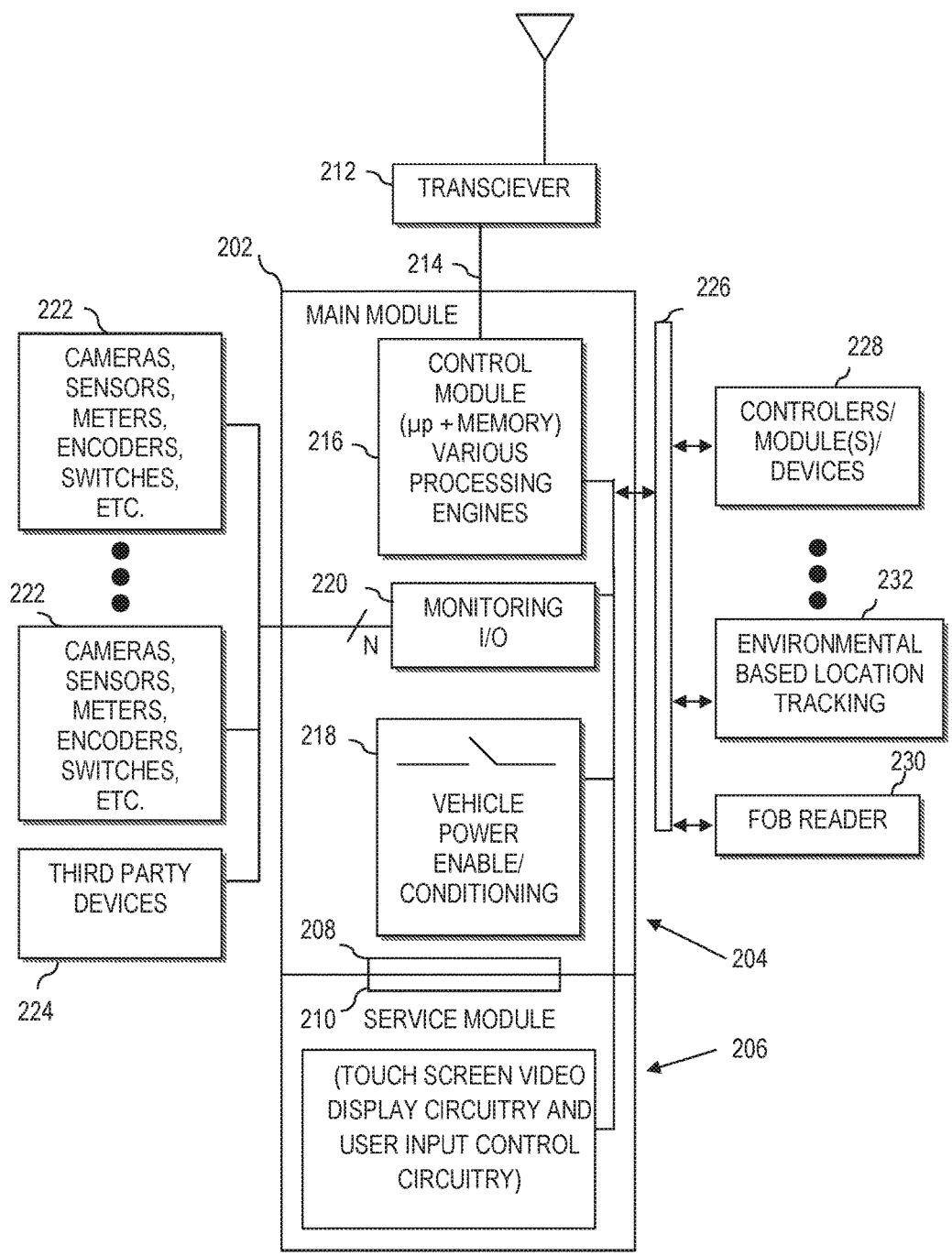
FIG. 2 is a block diagram of a special purpose processing device on an industrial vehicle, according to aspects of the present disclosure.

Industrial Vehicle:

Referring to FIG. 2, a processing device 202 is provided on an industrial vehicle (108 of FIG. 1). The processing device 202 is equivalent to and an example embodiment of the processing device 102 on the industrial vehicle 108 in FIG. 1. Here, the processing device 202 is a special purpose, particular hardware computer, such as a device that mounts to or is otherwise integrated with the industrial vehicle 108. The processing device 202 includes a processor coupled to memory to carry out instructions. However, the execution environment of the processing device 202 is further tied into the native electronics of the industrial vehicle 108 making it a particular machine different from a general purpose computer.

The illustrated processing device 202 is implemented as an information linking device that comprises the necessary circuitry to implement communication with a remote server, data and information processing for processing vehicle data, and wired (and optionally wireless) communication to components of the corresponding industrial vehicle 108 to which the processing device 202 is mounted.

According to aspects of the present disclosure, the processing device 202 is implemented as a main module 204 and a service module 206, which couple together to create an integrated device.

The main module 204 includes a rigid main-side data coupler 208. Correspondingly, the service module 206 is field-replaceable (defining a field-replaceable service module), and includes a display (e.g., an LCD), a set of user input controls (e.g., a touch screen, buttons, switches, encoders, etc.), and any necessary data processing circuitry. In this regard, the service module 206 provides a graphical user interface to the processing device 202.

The service module 206 also includes a rigid service-side data coupler 210 that couples to the rigid main-side data coupler 208 on the main module 204 to effect data communication (e.g., to pass display data) between the main module 204 and the service module 206. Thus, when the main module couples to the service module, the rigid main-side coupler aligns with and electrically connects to the service-side coupler.

The display of the service module 206 can comprise, for instance, a video screen, a liquid crystal display screen, a light emitting diode (LED) screen, a plasma screen, etc. Moreover, the display can include the appropriate technology to implement a touch screen display so as to respond to gesture controls implemented by touching the screen, swiping across the screen, and performing other gesture functions. The user input controls can include buttons, switches, sliders, encoders, knobs, voice recognition, keypad other forms of receiving user input, combinations thereof, etc. The user input controls interact with, or control, elements in the graphical user interface as viewed on the display. As such, a user of the vehicle can interact with the processing device 202, e.g., to respond to requests for information, to set up, organize, customize, etc., widgets and other display elements, or otherwise provide feedback to the processing device 202.

In an example implementation, whereas the main module 204 remains coupled to the industrial vehicle 108, the service module 206 is field-replaceable, and thus may be removed and replaced with a different service module 206. However, the service modules 206 do not store any vehicle-specific data, collected or otherwise. Thus, if the screen gets damaged, a new service module 206 may be coupled to the main module 204 without losing any information about the industrial vehicle 108.

Further, the main module 204 communicably couples to the service module 206 directly through the mating of rigid couplers (mating of the rigid main-side data coupler 208 with the rigid service-side data coupler 210) instead of a cable such as a ribbon cable. Thus, high-speed data may be transmitted between the main module 204 and service module 206, even in a noisy environment, because only one stable connection is utilized between the main module 204 and service module 206 (as opposed to two connections required by respective ends of a cable). Moreover, the main module 204, the service module 206, or both include one or more anti-vibration posts that prevent vibration damage or other performance degrading effects to the rigid couplers as will be described in greater detail herein.

In an illustrative example, the processing device 202 is connected to a transceiver 212 for wireless communication. Although a single transceiver 212 is illustrated for convenience, in practice, one or more wireless communication technologies may be provided (e.g., WiFi, Bluetooth, and cellular). For instance, the transceiver 212 may be able to communicate with a remote server, e.g., server 112 of FIG. 1, across the access points 110 of FIG. 1. The transceiver 212 may also optionally support other wireless communication, such as cellular, Bluetooth, radio frequency (RF), infrared (IR), or any other technology or combination of technologies. The transceiver 212 connects to the processing device 202 via a suitable electrical connection 214, e.g., an Ethernet connection. However, the transceiver 212 can connect to the processing device 202 using other connections. Alternatively, the transceiver 212 can be built in or otherwise integral with the processing device 202.

The processing device 202 also comprises data processing circuitry, e.g., illustrated conceptually as a control module 216, having a processor coupled to memory for implementing computer instructions, including the relevant methods, processes, or aspects thereof, as set out and described more fully herein. The control module 216 can also include other necessary processing circuitry and software, such as for implementing a display engine, camera processing engine, data processing engine(s), etc. In this regard, the control module 216 can include additional support circuitry, e.g., video ports, camera ports, input/output ports, etc. Moreover, the memory can include memory that stores processing instructions, as well as memory for data storage, e.g., to implement one or more databases, data stores, registers, arrays, etc. Additionally, the control module 216 implements processes such as operator log on, pre-use inspection checklists, data monitoring and other features, examples of which are described more fully in U.S. Pat. No. 8,060,400 to Wellman, the entirety of which is incorporated by reference herein.

The processing device 202 can also optionally include vehicle power enabling circuitry 218 that is controlled by the control module 216 to selectively enable, limit, or disable the industrial vehicle 108 and/or components of the industrial vehicle 108. In certain implementations, the vehicle power enabling circuitry 218 can partially enable the industrial vehicle for operation, or fully enable the industrial vehicle for operation, e.g., depending upon proper operator login.

Still further, the processing device 202 includes a monitoring input/output (I/O) module 220 to communicate via wired or wireless connection between peripheral devices mounted to or otherwise on the industrial vehicle, such as cameras, sensors, meters, encoders, switches, etc. (collectively represented by reference numeral 222) and the control module 216. The monitoring input output (I/O) module 220 may also be connected to other devices, e.g., third party devices 224 such as radio-frequency identification (RFID) scanners, displays, meters, bar code scanners, cameras, or other devices to convey information to the control module 216.

The processing device 202 is coupled to and/or communicates with other industrial vehicle system components via a suitable industrial vehicle network system 226, e.g., at least one vehicle network bus. The industrial vehicle network system 226 is any wired or wireless network, bus or other communications capability (or combination of multiple, independent networks, busses or other communications capabilities) that allows electronic components of the industrial vehicle 108 to communicate with each other. As an example, the industrial vehicle network system 226 may comprise a controller area network (CAN) bus, ZigBee, Bluetooth, Local Interconnect Network (LIN), time-triggered data-bus protocol (TTP), RS422 bus, Ethernet, universal serial bus (USB), other suitable communication strategy, or combinations thereof.

As will be described more fully herein, utilization of the industrial vehicle network system 226 enables seamless integration of the components of the industrial vehicle 108 with the processing device 202, and in particular, the control module 216. By way of example, the industrial vehicle network system 226 enables communication between the control module 216 and the native electronics including a vehicle control module, controllers (e.g., traction controller, hydraulics controller, etc.), vehicle specific modules and other electronic device 228 of the industrial vehicle 108, a fob reader 230, environmental based location tracking 232, etc. Also, the control module 216 can facilitate the communication of information from any electronic peripheral devices 222 or third party devices 224 associated with the industrial vehicle 108 (e.g., via the monitoring input output (I/O) module 220 bridging data to other vehicle resources) that integrate with and can communicate over the network system 226. Thus for example, the processing device 202 connects with, understands and is capable of communication with native vehicle components, such as controllers, modules, devices, bus enabled sensors, displays, lights, light bars, sound generating devices, headsets, microphones, haptic devices, etc. (collectively referred to by reference number 228).

Figure 3:
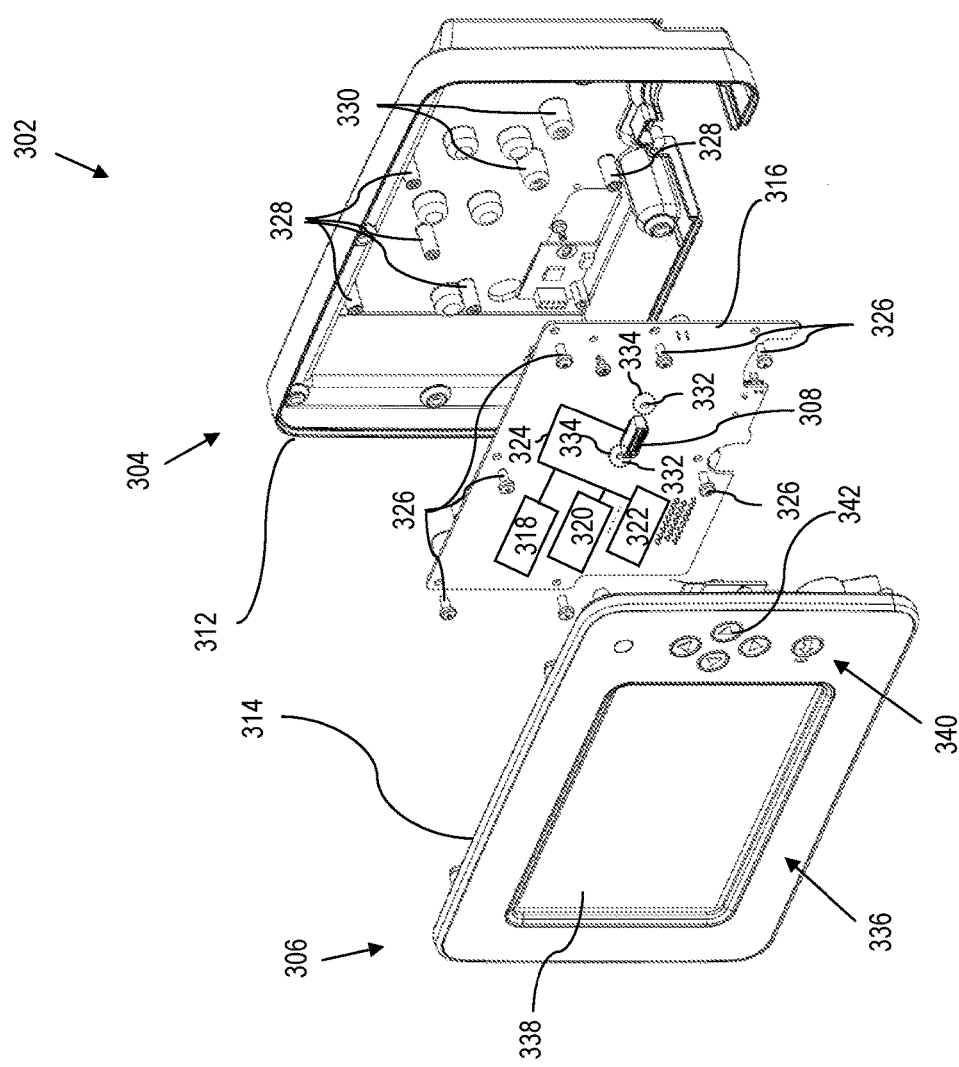
FIG. 3 is a schematic showing an isometric exploded view of a first processing device including a main module and a service module, according to various aspects of the present disclosure.
Figure 4:
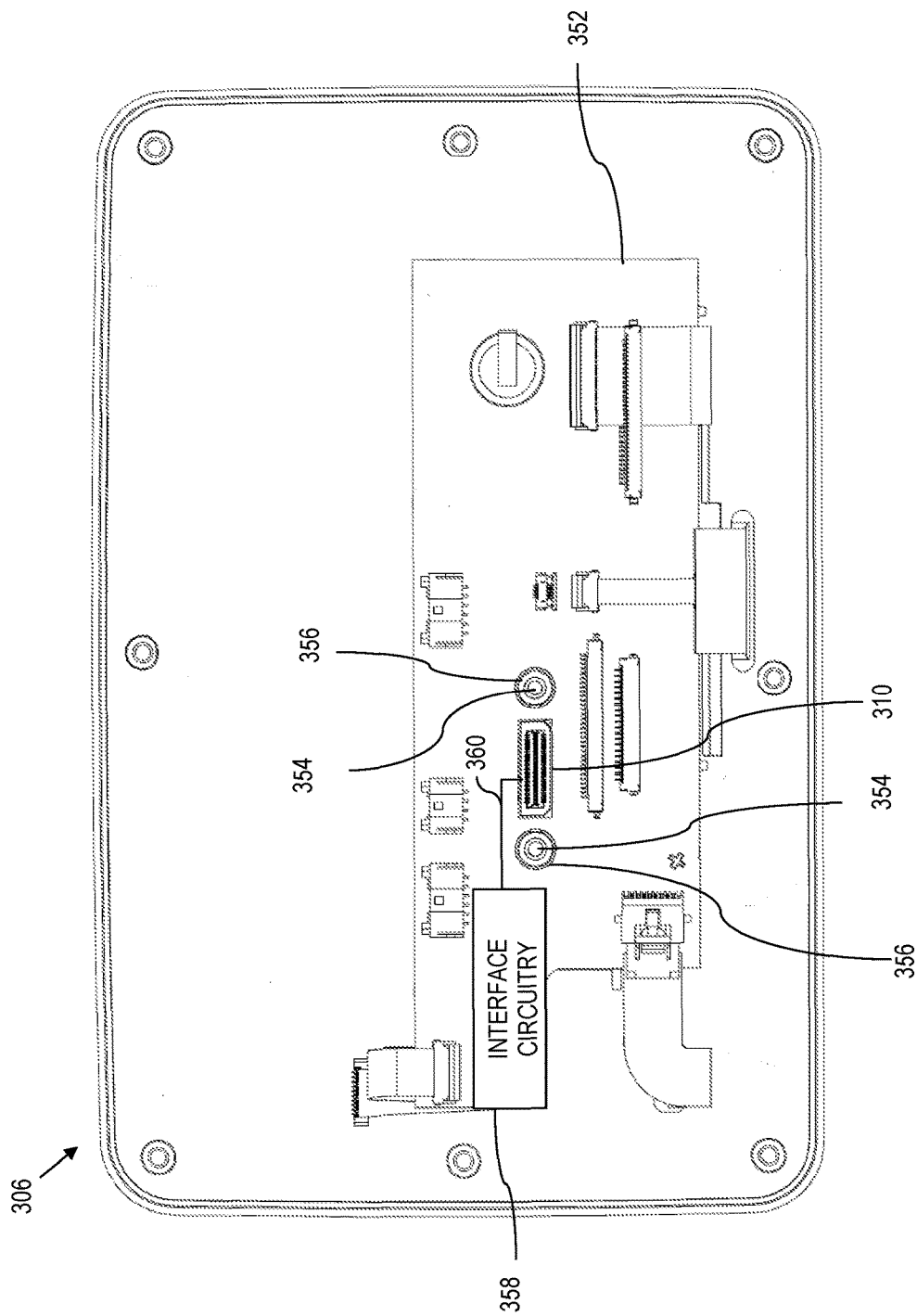
FIG. 4 is a schematic showing a view of the service module of the first processing device of FIG. 3, according to various aspects of the present disclosure.

Field-Replaceable User Interface:

Turning now to FIG. 3, an example embodiment of a processing device 302 is illustrated. The processing device 302 is an example embodiment of the processing device 102 of FIG. 1 and processing device 202 of FIG. 2. As illustrated, the processing device 302 includes a main module 304 (which is an example implementation of the main module 204 of FIG. 2), and a service module 306 (which is an example implementation of the service module 206 of FIG. 2). The main module 304 includes a rigid main-side data coupler 308. The corresponding service-side data coupler 310 is not visible in this view, but is illustrated in FIG. 4.

The main module 304 includes a first shell 312 that mates with a corresponding second shell 314 of the service module 306 so that when the first shell 312 is mated with the second shell 314, an industrial-grade processing device 302 is provided. In this regard, various gaskets, seals, dampeners, and other features may be provided to form a seal between the first shell 312 and the second shell 314.

The main module 304 includes a main module circuit board 316 that holds the rigid main-side data coupler 308 as well as main module circuitry, such as processor(s), memory, busses, and other electronics (e.g., to implement the control module 216, vehicle power enabling 218, monitoring input output (I/O) module 220, and other features described with reference to FIG. 2). As schematically illustrated in simplified form for sake of clarity, the main module circuitry includes a processor 318 that is communicably coupled to memory 320 and input/output circuitry 322 (as well as other circuitry to implement the features of FIG. 2). The main module circuitry is also electrically connected to the rigid main-side data coupler 308 via communication paths 324 so that the main module circuitry on the main module circuit board 316 can communicate with electronics in the service module 306 as set out in greater detail herein. In general, the processor 318 is configured to read instructions from the memory 320 to execute vehicle-specific processing, e.g., by interacting with vehicle data obtained via the input/output circuitry 322 (e.g., analogous to that described by the control module 216 interacting with the monitoring input output (I/O) module 220, communication with other vehicle components via the industrial vehicle network system 226, or combinations thereof, as set out with regard to FIG. 2).

The main module circuit board 316 can mount to the shell 312 via any suitable means, e.g., screws 326 that secure the main module circuit board 316 into protrusions 328 on the shell 312 that function as circuit board standoffs. Although illustrated in simplified schematic form, each screw 326 in practice can include male threads that mate with a corresponding threaded socket in the associated protrusion 328. Further, the shell 312 includes bosses 330 aligned with corresponding holes 332 on either side of the rigid main-side data coupler 308. The protrusions 328 and bosses 330 may be incorporated into the injection molded housing. By way of example, the shell 314 may be made out of a polycarbonate PET (Polyethylene terephthalate) material. Further, areas 334 around the holes 332 corresponding to the bosses 330 should be kept clear of any electronics, so the anti-vibration posts (described with reference to FIG. 4) contact the main module circuit board 316 directly.

The main module 304 mounts to an associated industrial vehicle (108 of FIG. 1) and is generally not meant to be removed. As such, any information stored on the main module circuit board 316 remains with the industrial vehicle. For example, the main module circuit board 316 may include memory 320 that stores a vehicle identification number, a vehicle model type, etc. For instance, in an example implementation, the memory 320 can store industrial vehicle identification information and a history of collected vehicle data, where the vehicle data is received via the input/output circuitry. Further, as noted with regard to FIG. 2, the industrial vehicle may include sensors such as accelerometers, gyroscopes, encoders, current sensors, voltage sensors, temperature sensors, etc., that communicate via the input/output circuitry 322 (e.g., analogous to the monitoring input output (I/O) module 220 and/or the industrial vehicle network system 226 of FIG. 2) and data from the vehicle components may be stored in the memory 320. To communicate over the vehicle network system (226 of FIG. 2), the main module 304 includes suitable connectors, such as a 4-pin connector, universal serial bus (USB) port, Ethernet port, secure digital (SD) card port, etc. Likewise, the monitoring I/O that connects to peripheral 222 include the necessary hardware and connections, e.g., to support a camera, video, meters, encoders, etc.

To get the vehicle data off of the industrial vehicle, the main module circuit board 316 may include or otherwise communicate with a wireless communications device that wirelessly communicates with a remote server, e.g., the transceiver 212 as set out with regard to FIG. 2. Moreover, the processor 318 coupled to memory 320 on the main module circuit board 316 can carry out custom programmed functionality, e.g., to implement vehicle control, modification, data acquisition and data logging, etc. For instance, the processor 318 may be configured to read instructions from the memory 320 to execute vehicle-specific processing. The processor 318 can also communicate data (e.g., display data) to (and optionally read data from) the rigid main-side coupler 308.

The service module 306 implements a graphical user interface. In particular, the service module 306 includes a frame 336 that provides a work area for a display 338 (LCD, LED, etc.), which can be implemented with a touch screen that supports gesture controls, e.g., touch to select, swipe, etc. The frame 336 also supports a control area 340 that includes user input controls 342 (e.g., five user-operable buttons as illustrated). In practice, the control area 340 can include any user input control, including buttons, encoders, switches, keypads, combinations thereof, etc.

Turning to FIG. 4, the service module 308 is shown from a back side and includes a service module circuit board 352 that drives the display 338 of FIG. 3. Similar to the main module (304 of FIG. 3), the service module circuit board 352 includes a rigid service-side data coupler 310 complementary to the rigid main-side data coupler (308 of FIG. 3) of the main module (304 of FIG. 3). For example, if the rigid main-side data coupler 308 of the main module 304 is male, then the rigid service-side data coupler 310 of the service module 308 is female, and vice-versa.

Moreover, the example service module 308 includes two anti-vibration posts 354 that extend past the service module circuit board 352 (extend orthogonal from the main surface of the service module circuit board 352 out of the page). As shown, the anti-vibration posts 354 start from behind the service module circuit board 352 and extend through to holes 356 within the service module circuit board 352. However, the anti-vibration posts 354 may be integral with the service module circuit board 352 or attached to a surface of the service module circuit board 352. Moreover, only a single anti-vibration post may be required, e.g., depending upon the size of the display, anticipated vibration, and other related factors.

The service module 308 also includes necessary interface circuitry 358 that is communicably coupled to the display 338 (FIG. 3) and the user input control 342 (FIG. 3). Yet further, the rigid service-side coupler 310 is electrically connected to the interface circuitry 358 via communication paths 360 on the service module circuit board 352. The interface circuitry 358 includes the necessary processing capability to pass information to the display 338, and optionally, to collect user input from the touch screen, co-located with the display 338 and/or user input control(s) 342 and to pass that information back to the processor 318 of the main module 304.

Referring to FIGS. 3-4 in general, when the rigid service-side data coupler 310 of the service module 308 is coupled to the rigid main-side data coupler 308 of the main module 304, a gap exists between the boards 316, 352 of the modules 304, 306 respectively. In an illustrative implementation, the anti-vibration post(s) 354 should be approximately the length of that gap. Further, the areas 334 around the holes 332 corresponding to the bosses 330 should be kept clear of any electronics, so the anti-vibration posts 354 contact the circuit board 352 directly. The bosses 330 and the anti-vibration posts 354 prevent the circuit board 316 from vibrating while the service module 306 is coupled to the main module 304. Thus, while the industrial vehicle is operating, the lack of vibrations (or at least dampening of any vibrations) will prevent wear and tear on the rigid main-side data coupler 308, rigid service-side coupler 310 and connection therebetween.

As such, when the service module 306 is attached to the main module 304, the rigid service-side coupler 310 aligns with and electrically connects to the rigid main-side coupler 308. Moreover, the service module 306 connects to the main module 304 by a temporary securement (e.g., screws, bolts, clasps, etc.) facilitating field replacement of the service module 306 to the main module 304. Still further, the first anti-vibration post 354 (and optionally, the second anti-vibration post 354) rigidly connects between the main module circuit board 316 and the service module circuit board 352 so as to hold the main module circuit board 316 spaced from and parallel to the service module circuit board 352. The rigid main-side coupler 308 electrically connects to the rigid service-side coupler 310 independently of a cable between the rigid main-side coupler 308 and the rigid service-side coupler 310. For instance, the rigid main-side coupler 308 directly electrically connects to the rigid service-side coupler 310. In this regard, the rigid coupling between the main module 304 and the service module 306 (via the rigid main-side coupler 308 and the rigid service-side coupler 310) allow information to be passed between the two modules in the shortest distance possible (instead of using a cable (e.g., a ribbon cable)).

Also, the rigid main-side coupler 308 can electrically connect to the rigid service-side coupler to create a plurality of electrical pathways between the main module circuitry 316 and the interface circuitry 358. For instance, the mating of the service-side coupler 310 to the main side-coupler 308 can create a first high-speed connection supporting communication of information to the display, a data throughput to communicate user interaction with the user control, combinations thereof, etc.

Moreover, if the display 338 gets damaged in any way, the service module 306 may be replaced without replacing the main module 304. Since all of the important vehicle information resides on the main module 304 (and not the service module 306), when the service module 306 is replaced, none of the important vehicle information is lost or needs to be transferred from the processing device 302 to the industrial vehicle itself. Further, the lack of vehicle information on the service module 306 makes the service modules fungible.

Figure 5:
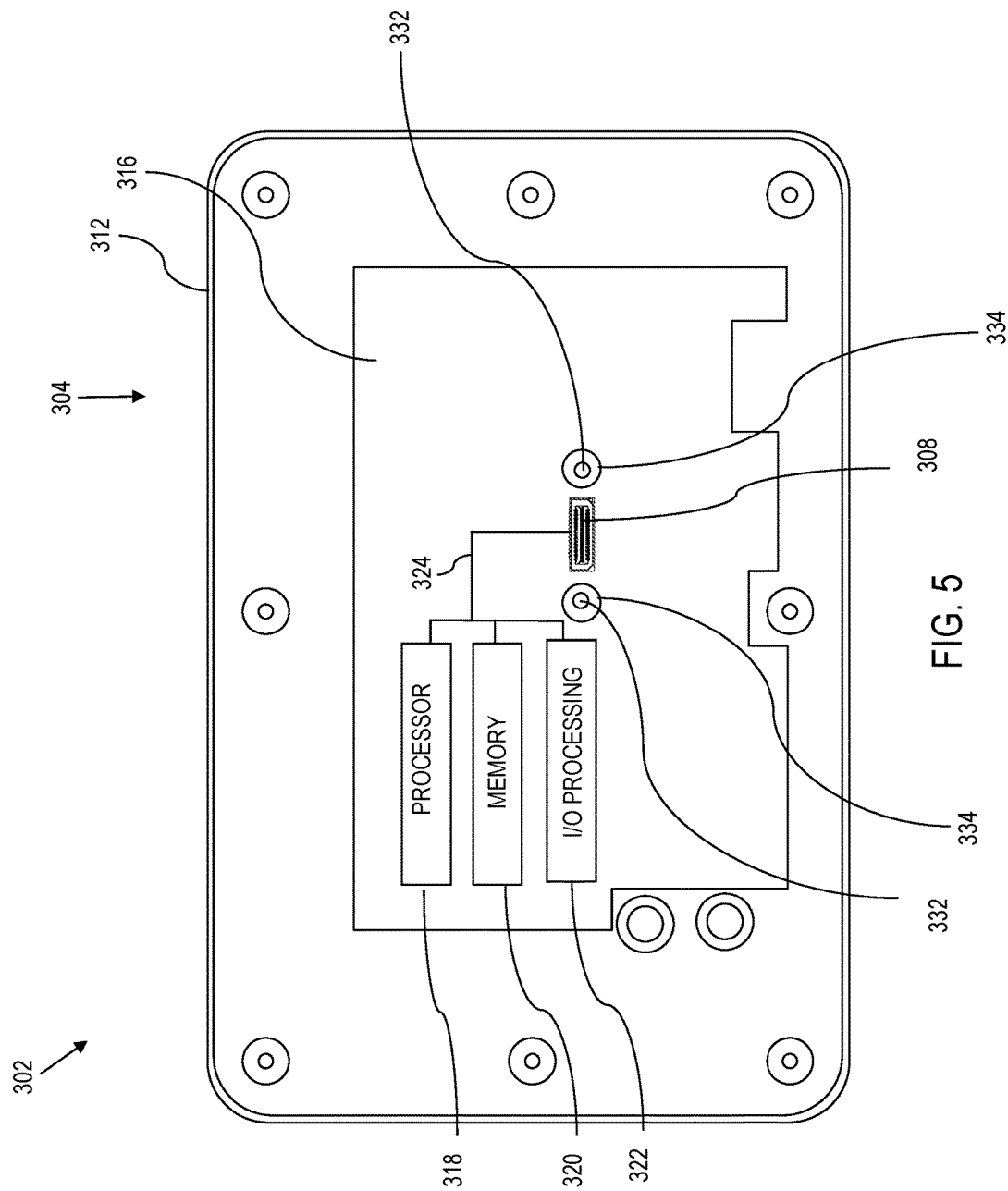
FIG. 5 is a schematic showing a view of the main module of the first processing device of FIG. 3, according to various aspects of the present disclosure.

FIG. 5 illustrates the main module 304 of the processing device 302 of FIG. 3 including the shell 312. FIG. 5 also illustrates the circuit board 316 containing the processor 318 communicably coupled to memory 320, input/output circuitry 322 and the rigid main-side data coupler 308. FIG. 5 further illustrates the holes 332 for the bosses 330, which include areas 334 without any electronics.

With reference to FIGS. 3-5 generally, the main module 304 is housed in a first shell 312 such that the rigid main-side coupler 308 may be exposed. Likewise, the service module 306 is housed in a second shell 314 such that the rigid service-side coupler 310 may be exposed. As such, when the main module 304 couples to the service module 306, the rigid main-side coupler 308 aligns with and electrically connects with the rigid service-side coupler 310, and the first shell 312 mates with the second shell 314 to form a sealed enclosure.

Figure 6:
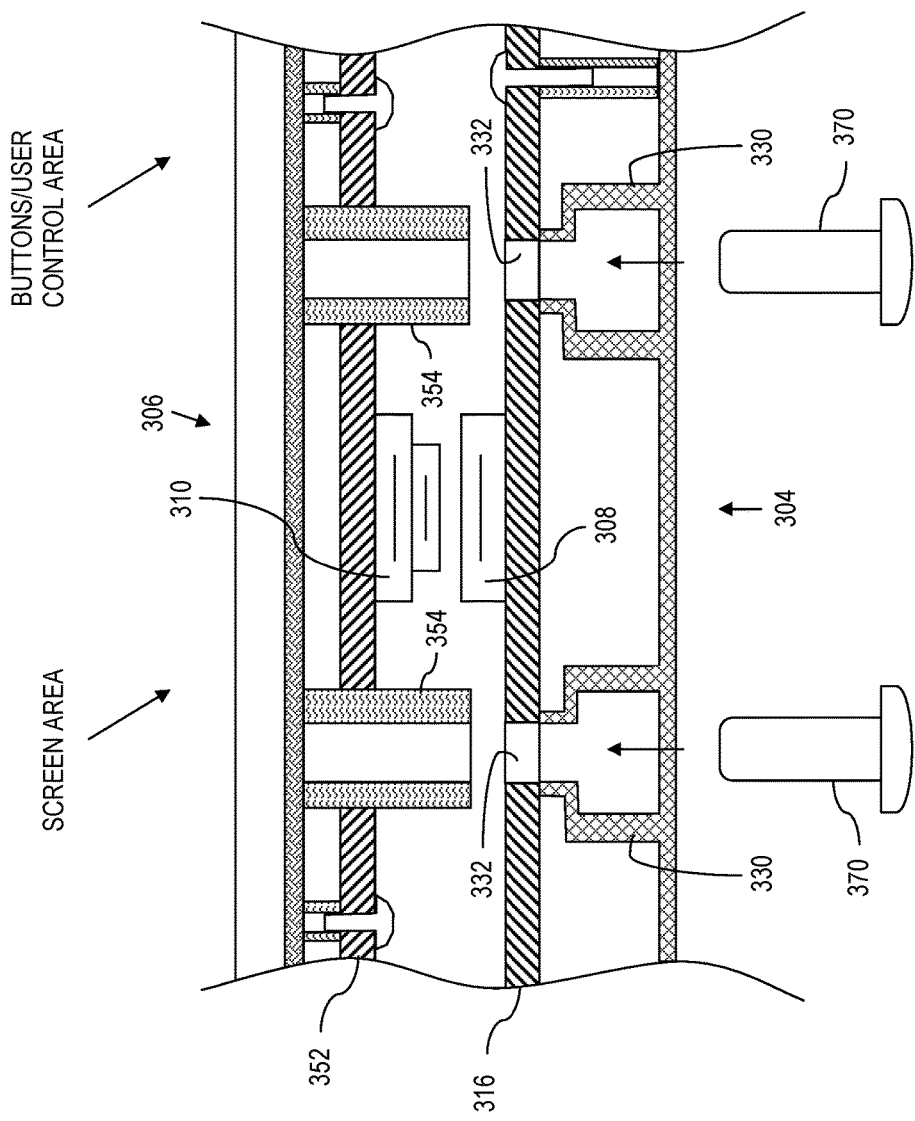
FIG. 6 is a partial schematic side view illustrating a main module aligned with a field replaceable service module, where an anti-vibration post is positioned on each side of a rigid coupler, according to aspects of the present disclosure herein.
Figure 7:
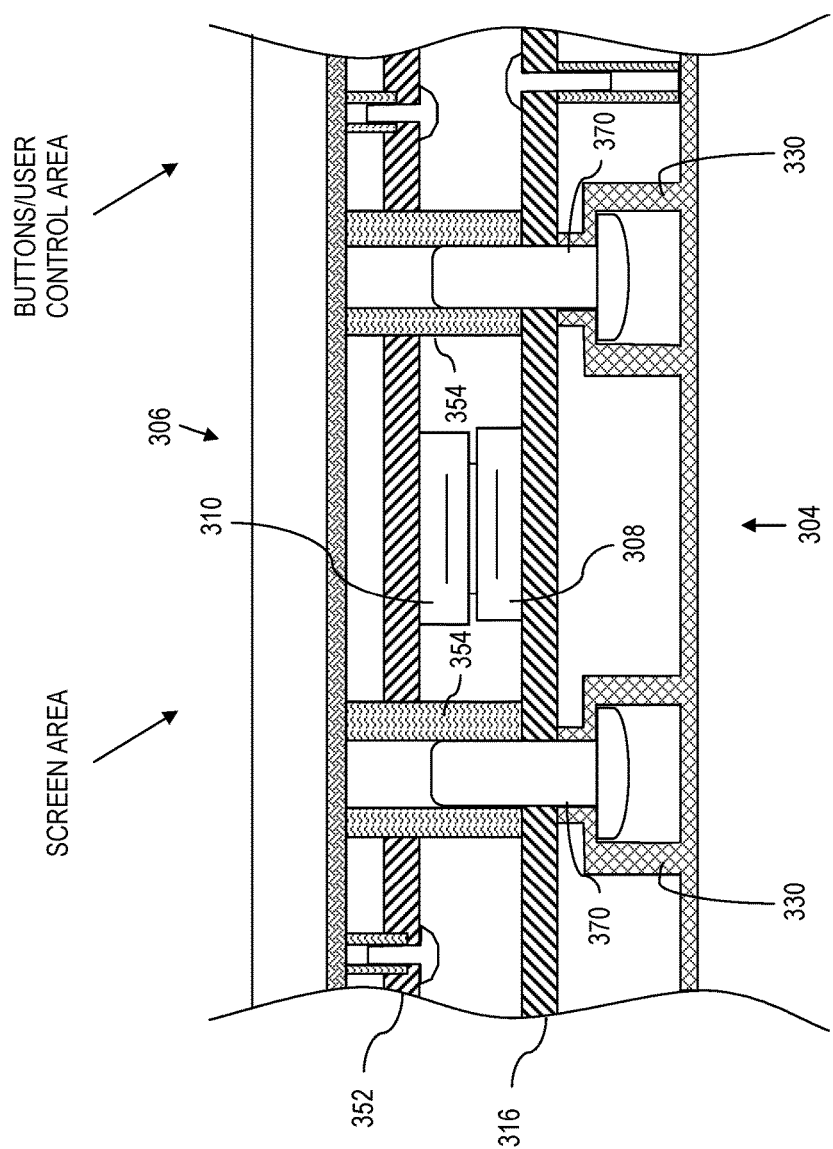
FIG. 7 is a partial schematic side view illustrating the main module mated with the field replaceable service module of FIG. 6, according to aspects of the present disclosure.
Figure 8:
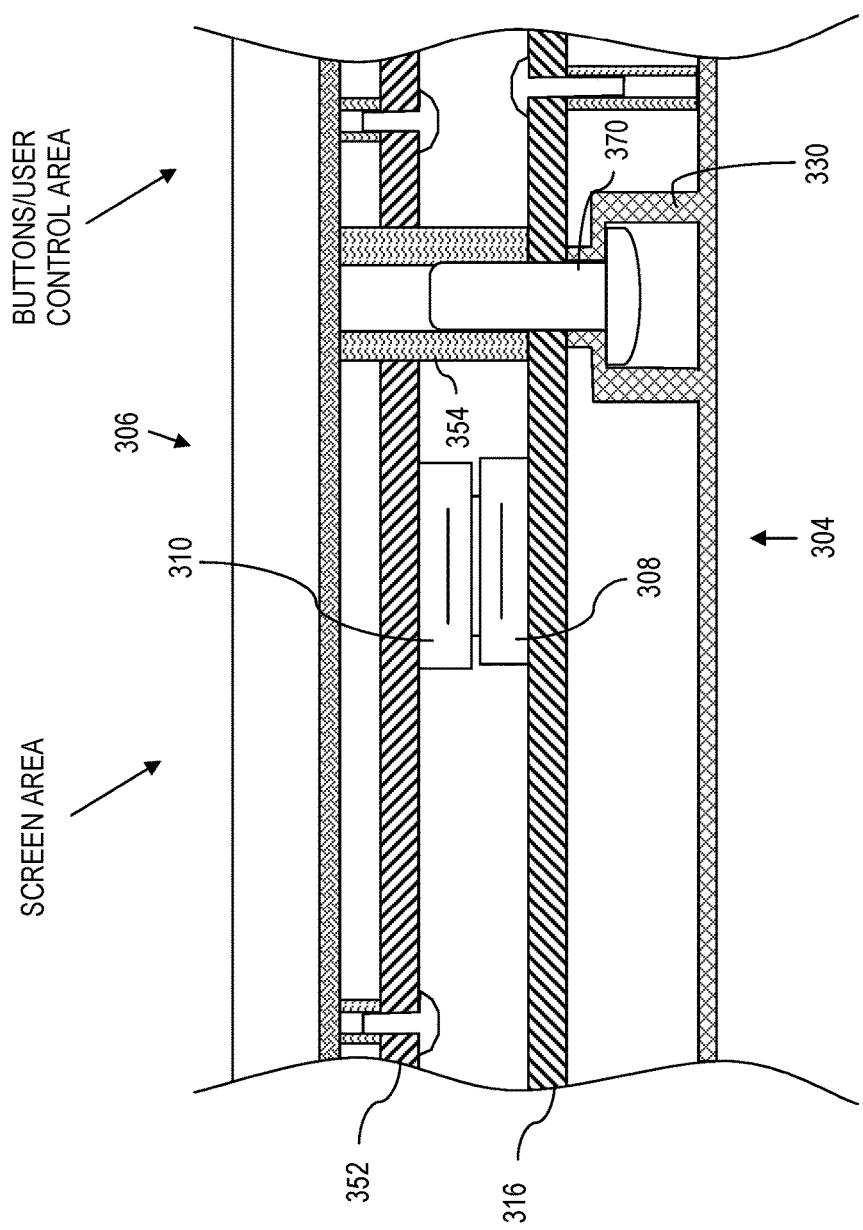
FIG. 8 is a partial schematic side view illustrating a main module mated with a field replaceable service module, where a single anti-vibration post is positioned adjacent to one side of a rigid coupler, according to aspects of the present disclosure herein.

Referring generally, to FIGS. 6-8, in an example implementation, a first boss 330 upon which a bottom of the main module circuit board 316 rests, is aligned to a first side of the rigid main-side coupler 308. A first anti-vibration post 354 extends from a major surface of the service module circuit board 352 spaced from a first side of the rigid service-side coupler 310. Likewise, an optional second boss 330 upon which the bottom of the main module circuit board 316 rests, is aligned to the second side of the rigid main-side coupler 308. Analogously, a second anti-vibration post 354 optionally extends from a major surface of the service module circuit board 352 spaced from a second side of the rigid service-side coupler 310. When the service module 306 is attached to the main module 304, the rigid service-side coupler 310 aligns with and electrically connects to the rigid main-side coupler 308.

The first boss 330 aligns with the first anti-vibration post 354, and a first screw 370 extends through the first boss 330, passes through a first hole 332 in the main module circuit board 316, and securely fastens to the first anti-vibration post 354. Although illustrated in simplified schematic form, each screw 370 in practice can include male threads that mate with a corresponding threaded socket in the associated anti-vibration post 354. Notably, a head of the screw 370 rests upon a well wall within the boss to form one part of the clamping action in cooperation with the screw threadably engaging the anti-vibration post 354. Optionally where provided, the second boss 330 aligns with the second anti-vibration post 354 and a second screw 370 extends through the second boss 330, passes through a second hole 332 in the main module circuit board 316, and securely fastens to the second anti-vibration post 354 analogous to that described above. For instance, again, although illustrated in simplified schematic form, each screw 370 in practice can include male threads that mate with a corresponding threaded socket in the associated anti-vibration post 354.

Also, in an example implementation, a first anti-vibration post 354 is sized such that the first anti-vibration post extends a gap between the main module circuit board 316 and the service module circuit board 352 when the main module 304 is mated with the service module 306, thus holding the main module circuit board 316 and the service module circuit board 352 parallel to one another. Similarly, a second anti-vibration post 354 is sized so as to also extend the gap between the main module circuit board 316 and the service module circuit board 352 when the main module 304 is mated with the service module 306. Thus for instance, in an example implementation, the main module further comprises a first anti-vibration post sized to be generally equal to a gap between the main module circuit board and the service module circuit board when the rigid service-side coupler aligns with and electrically connects to the rigid main-side coupler. Likewise, the main module can further comprise a second anti-vibration post sized to be generally equal to the size of the first anti-vibration post.

As best seen in FIGS. 4, 6, 7, and 8, in certain illustrative implementations, the first anti-vibration post 354 and the second anti-vibration post 354 flank the rigid main-side coupler 308 mated to the rigid service-side coupler 310.

Moreover, the anti-vibration post(s) 354 can extend from the service module circuit board 352. For instance, the anti-vibration post(s) 354 can be integral with the service module circuit board 352, e.g., via adhesive, screw or other form of tight coupling. Alternatively, the anti-vibration posts 354 can extend from the main circuit board 316. Yet further, the anti-vibration posts 354 can extend from the shell 312 and/or shell 316, or otherwise extend within the processing device 302 to provide strength and add to the rigidity of the main-side coupler 308 and service-side coupler 310. For instance, the anti-vibration post(s) 354 can extend through a first hole of the service module circuit board 352.

Notably, the number of bosses, anti-vibration posts, and other features described more fully herein may vary, e.g., due to the size of the display, enclosure or other factors. Moreover, although the specification describes a "circuit board", such may include one or more physical boards, e.g., main board plus daughter boards, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A processing device for an industrial vehicle, comprising:
    a main module having:
        a main module circuit board comprising:
            main module circuitry including a processor that is communicably coupled to memory and input/output circuitry, the processor configured to read instructions from the memory to execute vehicle-specific processing; and
            a rigid main-side coupler electrically connected to the main module circuitry; and
    a service module that defines a graphical user interface having:
        a display;
        a control area having a user input control; and
        a service module circuit board comprising:
            interface circuitry communicably coupled to the display and the user input control; and
            a rigid service-side coupler electrically connected to the interface circuitry;
    wherein:
        the rigid service-side coupler aligns with and electrically connects to the rigid main-side coupler when the service module is attached to the main module;
        the service module connects to the main module by a temporary securement facilitating field replacement of the service module to the main module;
        a first anti-vibration post extends a gap between the main module circuit board and the service module circuit board when the main module is mated with the service module; and
        a first fastener forms a clamp in cooperation with the first anti-vibration post to secure the main module circuit board relative to the service module circuit board.

2. The processing device of claim 1, wherein the rigid main-side coupler electrically connects to the rigid service-side coupler independently of a cable between the rigid main-side coupler and the rigid service-side coupler.

3. The processing device of claim 1, wherein the rigid service-side coupler directly electrically connects to the rigid main-side coupler.

4. The processing device of claim 1, wherein the rigid service-side coupler electrically connects to the rigid main-side coupler to create a plurality of electrical pathways between the main module circuitry and the interface circuitry.

5. The processing device of claim 1, wherein:
    the first anti-vibration post rigidly connects between the main module circuit board and the service module circuit board so as to hold the main module circuit board spaced from, and parallel to the service module circuit board.

6. The processing device of claim 1 further comprising:
    a second anti-vibration post sized so as to also extend the gap between the main module circuit board and the service module circuit board when the main module is mated with the service module.

7. The processing device of claim 6, wherein the first anti-vibration post and the second anti-vibration post flank the rigid main-side coupler mated to the rigid service-side coupler.

8. The processing device of claim 1, wherein the first anti-vibration post extends from the service module circuit board.

9. The processing device of claim 1, wherein the first anti-vibration post extends from the main module circuit board.

10. The processing device of claim 1, wherein the first anti-vibration post is integral with the service module circuit board.

11. The processing device of claim 1, wherein the first anti-vibration post is sized to be generally equal to a gap between the main module circuit board and the service module circuit board when the rigid service-side coupler aligns with and electrically connects to the rigid main-side coupler.

12. The processing device of claim 1, wherein the main module further comprises a second anti-vibration post sized to be generally equal to the size of the first anti-vibration post.

13. The processing device of claim 1 further comprising:
    a first boss upon which a bottom of the main module circuit board rests, aligned to a first side of the rigid main-side coupler;
    wherein the first anti-vibration post extends from a major surface of the service module circuit board spaced from a first side of the rigid service-side coupler;
    and wherein:
        when the service module is attached to the main module:

the rigid service-side coupler aligns with and electrically connects to the rigid main-side coupler:
the first boss aligns with the first anti-vibration post; and
a first screw extends through the first boss, passes through a first hole in the main module circuit board, and securely fastens to the first anti-vibration post.

14. The processing device of claim 1 further comprising:
a first boss upon which a bottom of the main module circuit board rests, aligned to a first side of the rigid main-side coupler, wherein the first anti-vibration post extends from a major surface of the service module circuit board spaced from a first side of the rigid service-side coupler;
a second boss upon which the bottom of the main module circuit board rests, aligned to a second side of the rigid main-side coupler; and
a second anti-vibration post extending from a major surface of the service module circuit board spaced from a second side of the rigid service-side coupler;
wherein:
when the service module is attached to the main module:
the rigid service-side coupler aligns with and electrically connects to the rigid main-side coupler:
the first boss aligns with the first anti-vibration post;
a first screw extends through the first boss, passes through a first hole in the main module circuit board, and securely fastens to the first anti-vibration post;
the second boss aligns with the second anti-vibration post;
a second screw extends through the second boss, passes through a second hole in the main module circuit board, and securely fastens to the second anti-vibration post.

15. The processing device of claim 1, wherein the mating of the service-side coupler to the main-side coupler creates a first high-speed connection, and a connection supporting communication of information to the display.

16. The processing device of claim 15, wherein the mating of the service-side coupler to the main-side coupler also creates a data throughput to communicate user interaction with the user control to the main module circuitry.

17. The processing device of claim 1, wherein the control area comprises a plurality of user input controls implemented as buttons.

18. The processing device of claim 1, wherein:
the main module is housed in a first shell such that the rigid main-side coupler is exposed; and
the service module is housed in a second shell such that the rigid service-side coupler is exposed; and
wherein:
when the main module couples to the service module, the rigid main-side coupler aligns with and electrically connects to the service-side coupler.

19. The processing device of claim 18, wherein:
when the main module couples to the service module, the first shell mates with the second shell to form a sealed enclosure.

20. The processing device of claim 1, wherein the memory of the main module circuitry stores industrial vehicle identification information and a history of collected vehicle data, where the vehicle data is received via the input/output circuitry.

21. The processing device of claim 1, wherein the display comprises a touch screen display.

* * * * *